United States Patent [19]

Iwata et al.

[11] 4,274,379

[45] Jun. 23, 1981

[54] METHOD AND SYSTEM FOR CONTROLLING IGNITION TIMING OF INTERNAL COMBUSTION ENGINES

[75] Inventors: Toshiharu Iwata, Aichi; Tadashi Hattori; Siniti Mukainakano, both of Okazaki; Kenji Goto; Daisaku Sawada, both of Susono, all of Japan

[73] Assignees: Nippon Soken, Inc., Nishio; Toyota Jidosha Kogyo Kabushiki Kaisha, Toyota, both of Japan

[21] Appl. No.: 47,935

[22] Filed: Jun. 12, 1979

[30] Foreign Application Priority Data

Jun. 13, 1978 [JP] Japan .................................. 53-71246
Jun. 13, 1978 [JP] Japan .................................. 53-71248

[51] Int. Cl.$^3$ .............................................. F02P 5/04
[52] U.S. Cl. .................................................. 123/425
[58] Field of Search ........ 123/117 D, 119 ED, 117 R, 123/425

[56] References Cited

U.S. PATENT DOCUMENTS 4,002,155  1/1977  Harned et al. ................... 123/117 D

*Primary Examiner*—Ronald B. Cox
*Attorney, Agent, or Firm*—Cushman, Darby & Cushman

[57] ABSTRACT

A method for controlling the ignition timing of internal combustion engines in which the magnitude of knocking is detected for each of at least two different magnitude levels. A knocking signal representing the detected magnitude level of the knocking and produced in each combustion cycle of the engine is sampled for a predetermined number of combustion cycles of the engine, and an ignition timing correction signal is produced to effect either to retard or advance depending on whether the sampled number of the knocking signals is above or below a predetermined reference number.

4 Claims, 13 Drawing Figures

METHOD AND SYSTEM FOR CONTROLLING IGNITION TIMING OF INTERNAL COMBUSTION ENGINES

BACKGROUND OF THE INVENTION

The present invention relates to a method and system for controlling the ignition timing of internal combustion engines whereby knocking is detected from the occurrence of vibrations, sound or the like caused inside and outside the cylinders of an engine due to the pressure therein and the ignition timing of the engine is adjusted to maintain a desired knock intensity.

The ignition timing of an engine must be controlled in accordance with the engine operating conditions so as to ensure the optimum operation of the engine. Ignition timing control systems known in the art are generally so designed that the ignition timing is controlled in accordance with the engine conditions represented by the engine speed detected by the centrifugal advance mechanism and the intake negative pressure detected by the vacuum advance mechanism.

It is known in the art that the best way from the standpoint of engine efficiency and fuel consumption is to effect the ignition at a position near a so-called minimum advance for best torque or MBT, and the ignition timing must be adjusted to the MBT in accordance with the engine conditions.

However, if the ignition timing is advance under certain engine conditions, knocking will be caused and stable operation of the engine will not be ensured. Generally, it is known that there is a close correlation between the ignition timing and the cylinder pressure so that when a mixture is exploded, if no knock occurs, no harmonic component (usually a frequency component in the range 5 to 10 KHz) will be superimposed on the cylinder pressure, whereas if knock occurs, such harmonic pressure variation will be caused. This results in the generation of vibration or sound outside the cylinder. Many different types of so-called knocking feedback ignition system have been proposed in which such vibration or sound is detected to control the ignition timing.

The known systems of this type are such that the ignition timing is controlled in response to every combustion phenomenon, that is, the presence or absence of knock is detected in response to each explosion stroke of the respective cylinders and the resulting detection signal is utilized in such a manner that as for example, when knock occurs the ignition timing is retarded by a predetermined angle, and when it is determined that there is no knock the ignition timing is advanced by a predetermined angle.

However, the use of feedback in this type of system has a great disadvantage that in the case of a multicylinder engine, due to the difference in intake lines for fuel distribution, mixture distribution, etc., among the cylinders as well as the difference in conditions (deposit, compression ratio, etc.) among the combustion chambers, variation in combustion among the cylinders will be increased, thus increasing the hunting range of the ignition timing and thereby causing surging or slugging.

SUMMARY OF THE INVENTION

In view of these deficiencies, it is an object of the invention to provide a method and system for ignition timing control in which the frequency of sampling of explosion in an engine is selected to be several tens of times or over and the ignition timing is fed back in such a manner that the number of occurrences of knock is limited to less than several % of the sampling frequency, thus ensuring the optimum ignition timing irrespective of types of fuel, differences in characteristics among engines caused during their manufacture, change with time, etc., and also overcoming such disadvantages as surging, slugging, etc.

It is another object of the invention to provide an ignition timing control method and system in which with a view to providing a condition in which the number of occurrences of trace known of smaller knock intensity is maintained less than several % of the sampling frequency, knock is detected and the number of occurrences of knock is counted according to several degrees of knock intensity to detect the ratio of the classified numbers of occurrences of knock to the several tens of times of sampling or over and thereby to maintain the ratio of severe knock (heavy knock and light knock) lower than a smaller value.

It is another object of the invention to provide an ignition timing control method and system whereby particularly with a view to maintaining a trace knock condition of lower knock intensity, when light knock, heavy knock or the like occurs which is more severe in knock intensity than the trace knock, the number of occurrences of such knock is recorded at a predetermined rate and the ignition timing is rapidly retarded, thus controlling the knock condition to the trace knock condition.

Thus the present invention has among it great advantages the fact that since the occurrence of knock is detected by a knock detecting circuit to control the ignition timing to a trace knock condition where the knock ratio is less than several % and the occurrence of light knock and heavy knock which are detrimental to the engine is reduced to a minimum, the ignition timing can be controlled to the optimum from the standpoint of engine operation in accordance with each of several degrees of knock intensity with the resulting improvement in the power output and fuel consumption and that the ignition timing is fed back by sampling combustion of the engine several tens to several tens of thousands of times, there is no danger of causing such phenomena as surging, slugging and the like, and moreover it is possible to offset the effects of aging, changes in the use conditions such as change in the composition of fuel, the differences in characteristics among different engines due to their manufacture, etc.

Another advantage of the invention is that since the presence or absence of knock and knock intensity are detected by a knock detecting circuit to control the ignition timing to a trace knock condition where the ratio of knock is less than several %, the ignition timing can be controlled to the optimum from the standpoint of engine operation in accordance with the respective knock intensities with the resulting improvement in the power output and fuel consumption, and that by virtue of the weighting of heavy knock and light knock, it is possible to prevent any overadvancing of the ignition timing and thereby to prevent any frequent occurrence of heavy knock or the like.

DESCRIPTION OF THE PREFERRED EMBODIMENTS

The invention will now be described in greater detail with reference to the illustrated embodiments.

Figure 1:
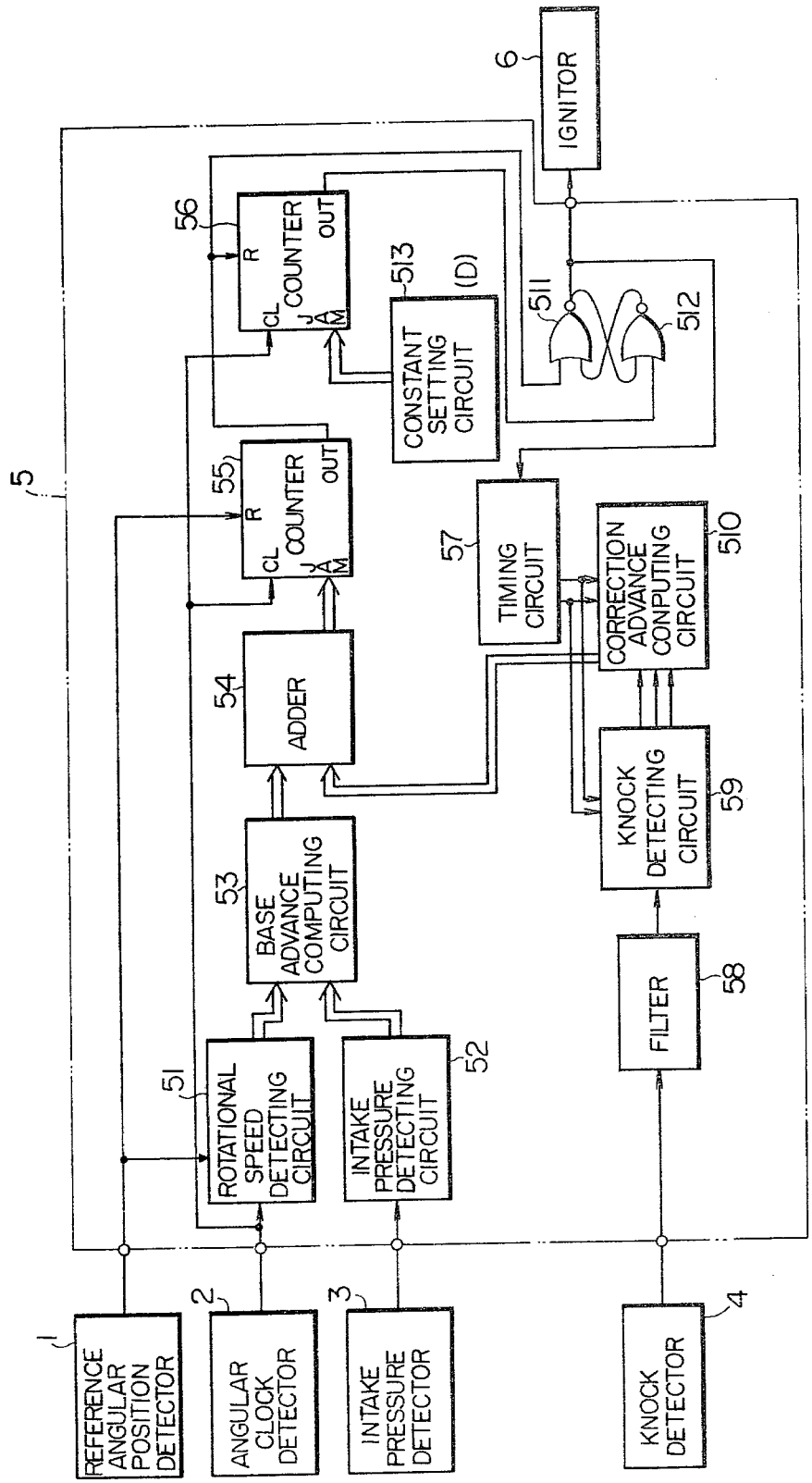
FIG. 1 is a block diagram showing an embodiment of an ignition timing control system according to the invention.

Referring first to FIG. 1 showing a block diagram for an embodiment of the invention, numeral 1 designates a reference angular position detector for generating a crankshaft reference angular position signal T (two signals at equal intervals for every revolution of a four-cylinder, four-cycle internal combustion engine), 2 an angular clock detector for detecting a position corresponding for example to one degree of crankshaft rotation or 1° crank angle, and 3 an intake pressure detector for detecting the pressure in the intake manifold of the engine. Numeral 4 designates a knock detector for detecting vibration of the engine body or sound wave associated with a knocking phenomenon of the engine, which may for example be of a piezoelectric element type (piezoelectric element), dynamic type (magnet, coil) or the like. Numeral 5 designates an ignition advance computing circuit connected to the reference angular position detector 1, the angular clock detector 2, the intake pressure detector 3 and the knock detector 4 to control the ignition timing in accordance with the engine conditions. Numeral 6 designates an ignitor whereby the output signal of the ignition advance computing circuit 5 is subjected to power amplification to switch on and off the current flow to the ignition coil which is not shown.

The ignition advance computing circuit 5 comprises a rotational speed detecting circuit 51 responsive to the signals from the reference angular position detector 1 and the angular clock detector 2 to detect the rotational speed of the engine, an intake pressure detecting circuit 52 responsive to the signal from the intake pressure detector 3 to detect the intake pressure of the engine, a base advance computing circuit 53 comprising a read-only memory (hereinafter referred to as an ROM) storing a predetermined program so that the desired ignition advance in terms of a retard angle from a reference angular position T is generated in response to the rotational speed signal N from the rotational speed detecting circuit 51 and the intake pressure signal P from the intake pressure detecting circuit 52, a filter 58 such as a bandpass filter or high-pass filter for selecting and transmitting only the knocking frequency component from the output of the knock detector 4, a knock detecting circuit 59 responsive to the output of the knock detector 4 transmitted through the filter 58 to detect the presence of knock, a correction advance computing circuit 510 responsive to the signal from the knock detecting circuit 59 to compute an advance correction value, a timing circuit 57 for applying various timing signals to the knock detecting circuit 59 and the correction advance computing circuit 510, an adder 54 for performing the operation of addition on the programmed value from the base advance computing circuit 53 and the correction value from the correction advance computing circuit 510, counters 55 and 56 each having inputs JAM, a constant setting circuit 513 for determining the operating angle (D°) of the ignition coil, and NOR circuits 511 and 512 constituting a flip-flop.

Figure 2:
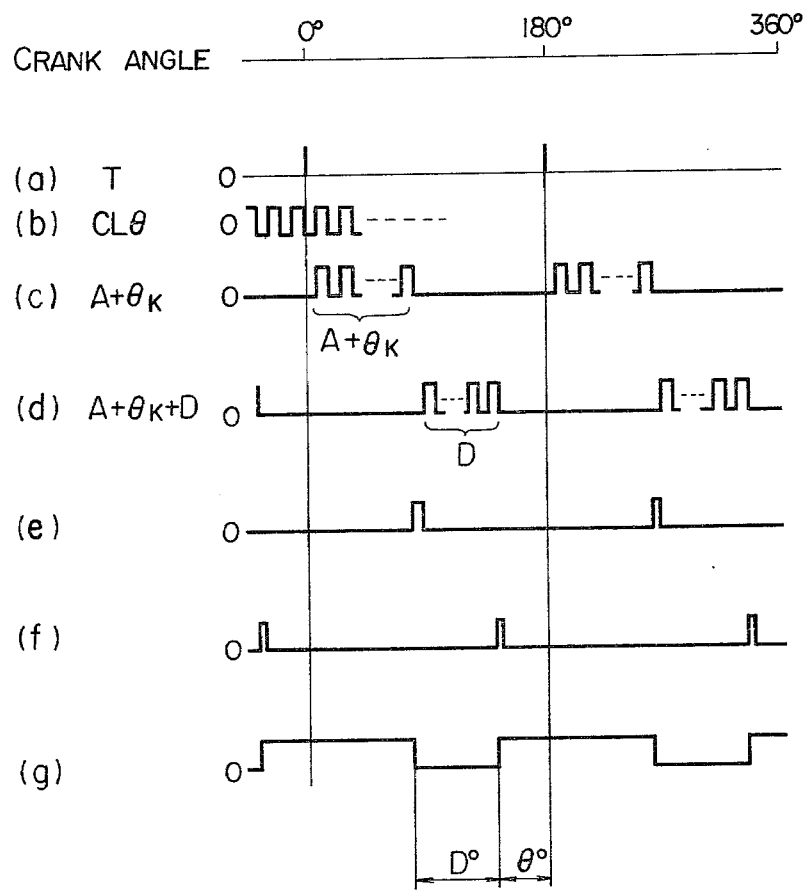
FIG. 2 is a time chart useful for explaining the operation of the embodiment shown in FIG. 1.
Figure 3:
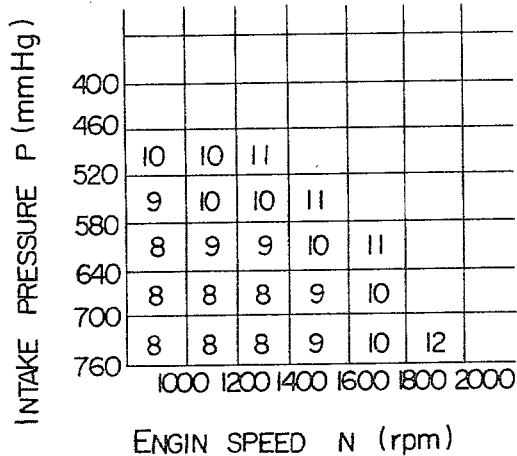
FIG. 3 is an ignition timing program diagram for the embodiment shown in FIG. 1.
Figure 4:
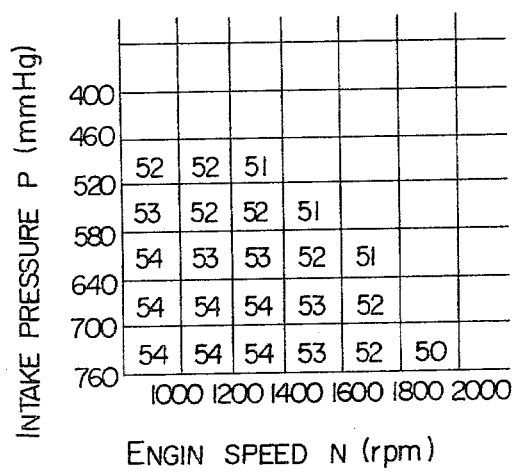
FIG. 4 is a retard angle program diagram for the embodiment shown in FIG. 1 corresponding to the program shown in FIG. 3.

Next, the operation of the above-mentioned embodiment excluding the timing circuit 57, the filter 58, the knock detecting circuit 59 and the correction advance computing circuit 510 will be described. The reference angular position detector 1 generates the reference signal T (two signals for every crankshaft revolution) shown in (a) of FIG. 2 at the top dead center of each cylinder. The angular clock detector 2 generates the angular signal $CL\theta$ shown in (b) of FIG. 2 and each corresponding to one degree of the crankshaft rotation. The base advance computing circuit 53 contains the advance angle values determined according to the values of the rotational speed signal N from the rotational speed detecting circuit 51 and the intake pressure signal P from the intake pressure detecting circuit 52, and the advance angle values are stored in the ROM in terms of retard angles from the reference position. In other words, FIG. 3 shows the reference advance angles $\theta$ determined in accordance with the values of the rotational speed signal N and the intake pressure P, and in consideration of the reference position (180° in this case), the reference value $\theta_{ko}$ for the correction advance from the correction advance computing circuit 510 (in this case the computation is made with $\theta_{ko}=10°$) and the dwell angle (e.g., 108°) the values shown in FIG. 4 are stored in the ROM as retard angles A each of which is given by $A=180-\theta-\theta_{ko}-D=62-\theta$. For instance, it is programmed so that with the intake pressure in the range 760 to 700 mmHg, when the rotational speed N is in the range 1200 to 1400 rpm, $\theta=8°$ BTDC and hence A=54°, when 1400 to 1600 rpm, $\theta=9°$ BTDC and hence A=53°, and when 1600 to 1800 rpm, $\theta=10°$ BTDC and hence A=52°. On the other hand, with the intake pressure P in the range 580 to 520 mmHg, when the rotational speed N is in the range 1200 to 1400 rpm, $\theta=10°$ BTDC and hence A=52°, when 1400 to 1600 rpm, $\theta=11°$ BTDC and hence A=51° and so on. Finer the division of the programmed values is, more satisfactory results will be obtained from the standpoint of accuracy but with the corresponding increase in the capacity of the ROM. In such a case, by connecting the programmed points with a straight line and using the interpolation, it is possible to reduce the capacity of the ROM. For example, it is only necessary to arrange so that in the previously mentioned case, when the intake pressure P is in the range 760 to 700 mmHg, A = 54° is selected for N = 1200 rpm and A = 50° for N = 1800 rpm and the following computation is performed A = [(50−54)/(1800−1200)] × ΔN + 54 (where ΔN is the rotational speed $N_x - 1200$). The retard angle A from the base advance computing circuit 53 and the correction advance angle $\theta_k$ from the correction advance computing circuit 510 are added by the adder 54 and the sum $(A + \theta_k)$ is applied to the inputs JAM of the counter 55. The counter 55 is reset by the reference angular signal T and the angular signals $CL\theta$ are counted as shown in (c) of FIG. 2. When the count attains the value $(A + \theta_k)$, the output of the counter 55 goes to a "1" level as shown in (e) of FIG. 2, so that the NOR circuit 511 of the flip-flop is triggered and the other counter 56 is reset. After the counter 56 has been reset by the output of the counter 55, the counter 55 is preset by the constant setting circuit 513 as shown in (d) of FIG. 2 so that when the count attains the preset value D, the output of the counter 56 goes to the "1" level as shown in (f) of FIG. 2 and the NOR circuit 512 is triggered. The output of the NOR circuit 511 changes as shown in (g) of FIG. 2 and the output is coupled to the ignitor 6. In this case, the time that the output of the counter 56 goes to the "1" level corresponds to the desired ignition timing, the time that the output of the counter 55 goes to the "1" level corresponds to the time that the energization of the ignition coil is started, and the dwell angle corresponds to the preset value D°.

Figure 5:
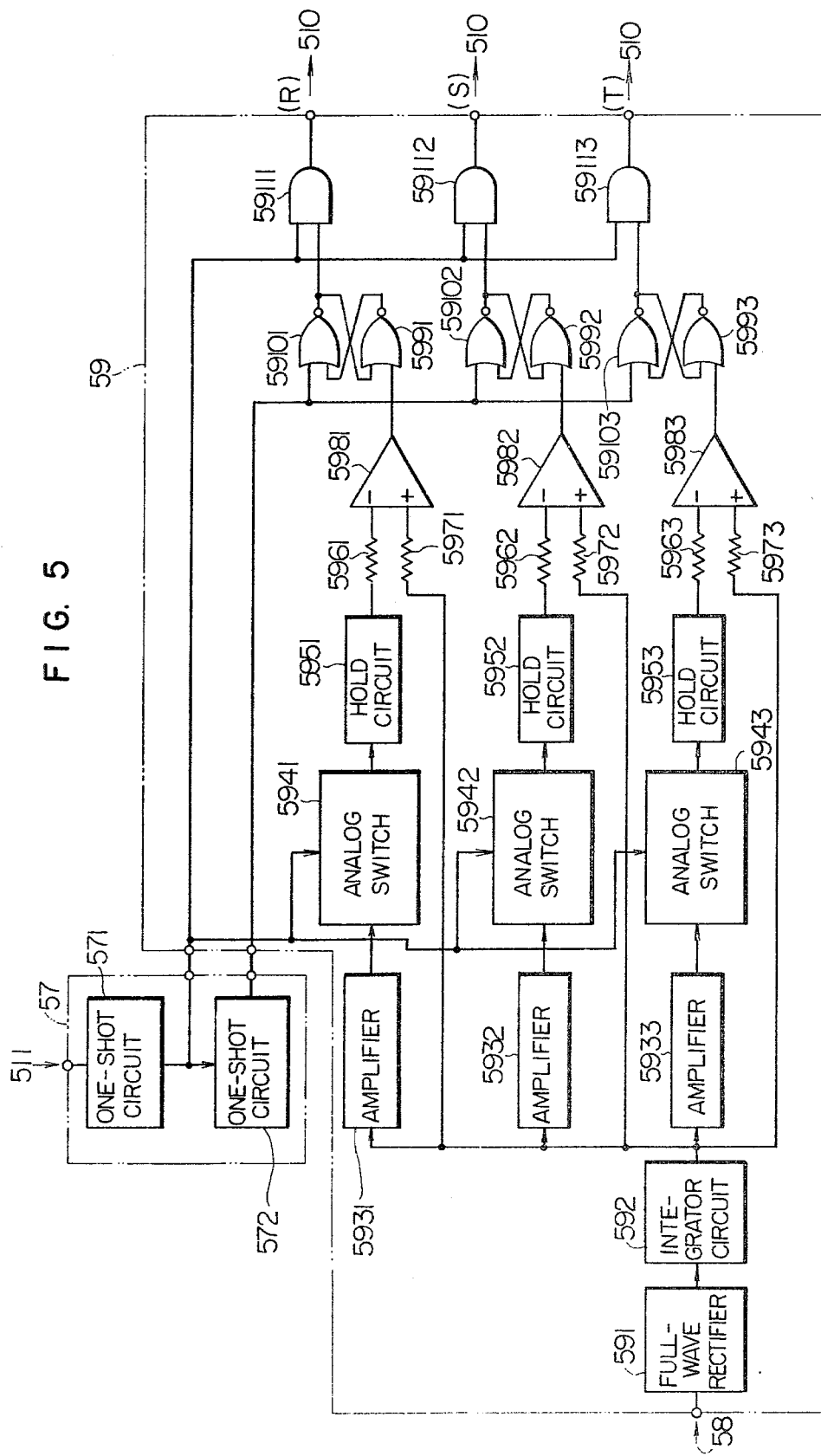
FIG. 5 is a block diagram showing an embodiment of the timing circuit and the knock detecting circuit in the embodiment shown in FIG. 1.

The detection of knock by means of the timing circuit 57, the filter 58 and the knock detecting circuit 59 will now be described. Referring to FIG. 5, the timing circuit 57 receives the output signal of the NOR circuit 511 connected to the ignitor 6 and it comprises one-shot circuits 571 and 572. The one-shot circuit 571 generates a pulse signal of a time width $\tau_1$ which goes to the "1" level in response to the ignition discharge as shown in (a) of FIG. 8, and the one-shot circuit 572 generates a pulse signal of a time width $\tau_2$ which goes to the "1" level in response to the negative-going transition of the pulse signal of $\tau_1$ from the one-shot circuit 571. The outputs of the one-shot circuits 571 and 572 are coupled to the knock detecting circuit 59. The knock detecting circuit 59 receives, in addition to the timing signals, vibration waves of a predetermined band width (5 to 10 KHz in this embodiment) from the knock detector 4 through the filter 58.

The knock detecting circuit 59 shown in FIG. 5 comprises a full-wave rectifier circuit 591, an integrator circuit 592, three amplifiers 5931, 5932 and 5933, three analog switches 5941, 5942 and 5943, three hold circuits 5951, 5952 and 5953 each comprising a resistor and a capacitor, input resistors 5961, 5971, 5962, 5972, 5963 and 5973, three comparator circuits 5981, 5982 and 5983, NOR circuits 5991, 59101, 5992, 59102, 5993 and 59103, and AND circuits 59111, 59112 and 59113. A vibration input is full-wave rectified by the full-wave rectifier circuit 591 and then smoothed by the integrator circuit 592 comprising a parallel combination of a resistor and a capacitor, thus generating the average value of the vibration input which is in turn compled to the amplifiers 5931, 5932 and 5933 and the resistors 5971, 5972 and 5973. The average value is amplified $K_1$, $K_2$ and $K_3$ times by the amplifiers 5931, 5932 and 5933, respectively, and then applied to the hold circuits 5951, 5952 and 5953, respectively, through the analog switches 5941, 5942 and 5943 each adapted to be turned on during the time $\tau_1$. Thus the average vibration input during the time $\tau_1$ immediately following each ignition is generated from the hold circuits 5951, 5952 and 5953, respectively. The outputs are respectively applied through the resistors 5961, 5962 and 5963 to one inputs of the comparator circuits 5981, 5982 and 5983 and the output of the integrator circuit 592 is coupled as such to their other inputs through the resistors 5971, 5972 and 5973. In this case, the vibration input which was memorized during the time $\tau_1$ represents the average value of the base vibration containing a noise signal and the values which are respectively $K_1$, $K_2$ and $K_3$ times the average value are comared in magnitude with the direct integrator output signal. In this case, since no knocking phenomenon takes place during the time interval from the time immediately following the ignition until a flame core is formed, by selecting the time width $\tau_1$ equal to the time required for the formation of a flame core (usually the time is no more than 1 msec after the ignition), it is possible to detect the base vibration, and when the combustion proceeds so that knock occurs thus increasing the vibration the increased vibration is compared in magnitude with the base vibration to determine the presence of knock. Generally, the base vibration increases with an increase in the engine rotational speed and it also varies depending on the intake pressure. Thus, by using this method, it is possible to detect the occurrence of knock in a wide range of engine operating conditions.

Figure 6:
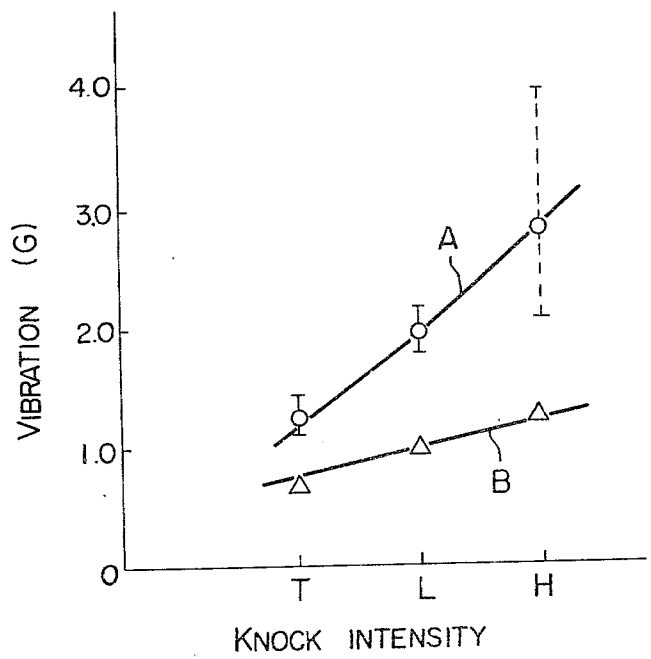
FIG. 6 is a diagram showing a knock intensity characteristic of an internal combustion engine.

On the other hand, the magnitude of vibration differs greatly depending on the intensity of knock. For example, at the engine rotational speed of 2000 rpm, the intake negative pressure of 240 mmHg and the filter frequency of 5 to 10 KHz, as shown by the characteristic A of FIG. 6, the amount of vibration is 3 times in the case of heavy knock H, 2 times in the case of light knock L and bout 1.5 times in the case of trace knock T as compared with the base vibration B. By selecting the amplification factors $K_1$, $K_2$ and $K_3$ of the amplifiers 5931, 5932 and 5933 $K_1 = 2.5$, $K_2 = 1.8$ and $K_3 = 1.3$, for example, the signal which is directly appllied from the integrator will be compared in magnitude with the values which are respectively 2.5, 1.8 and 1.3 times the average value. When knock occurs, if this is a heavy knock condition where the magnitude of the knocking vibration is greater than 2.5 times the base vibration, the outputs of the comparator circuits 5981, 5982 and 5983 all go to the "1" level and are respectively applied to one inputs of the flip-flops formed by the NOR circuits 5991 and 59101, 5992 and 59102, and 5993 and 59103. Thus the outputs of the NOR circuits 59101, 59102 and 59103 are all changed to the "1" level. In the case of a light knock condition where the magnitude of the knocking vibration is in the range of 1.8 to 2.5 times the base vibration, the output of the comparator circuit 5981 goes to the "0" level and the outputs of the comparator circuits 5982 and 5983 go to the "1" level, so that the output of the NOR circuit 59101 remains at the "0" level and the outputs of the NOR circuits 59102 and 59103 go to the "1" level. Similarly, in the case of a trace knock condition where the magnitude of the knocking vibration is in the range of 1.3 to 1.8 times the base vibration, the outputs of the comparator circuits 5981 and 5982 go to the "0" level and the output of the comparator circuit 5983 goes to the "1" level, so that the outputs of the NOR circuits 59101 and 59102 remain at the "0" level and the output of the NOR circuit 59103 goes to the "1" level. In the case of a non-knocking condition where the magnitude of the knocking vibration is less than 1.3 times the base vibration, the outputs of the comparator circuits 5981, 5982 and 5983 all go to the "0" level and consequently the outputs of the NOR circuits 59101, 59102 and 59103 all remain at the "0" level. The outputs of the NOR circuits 59101, 59102 and 59103 are respectively appied to one inputs of the AND circuits 59111, 59112 and 59113 whose other inputs receive the pulse of the time width $\tau_1$, so that only when the output of the NOR circuits 59101, 59102 and 59103 are respectively at the "1" level, the AND circuits 59111, 59112 and 59113 respectively generate knock signals (R), (S) and (T) in synchronism with the pulse of the time width $\tau_1$.

Figure 7:
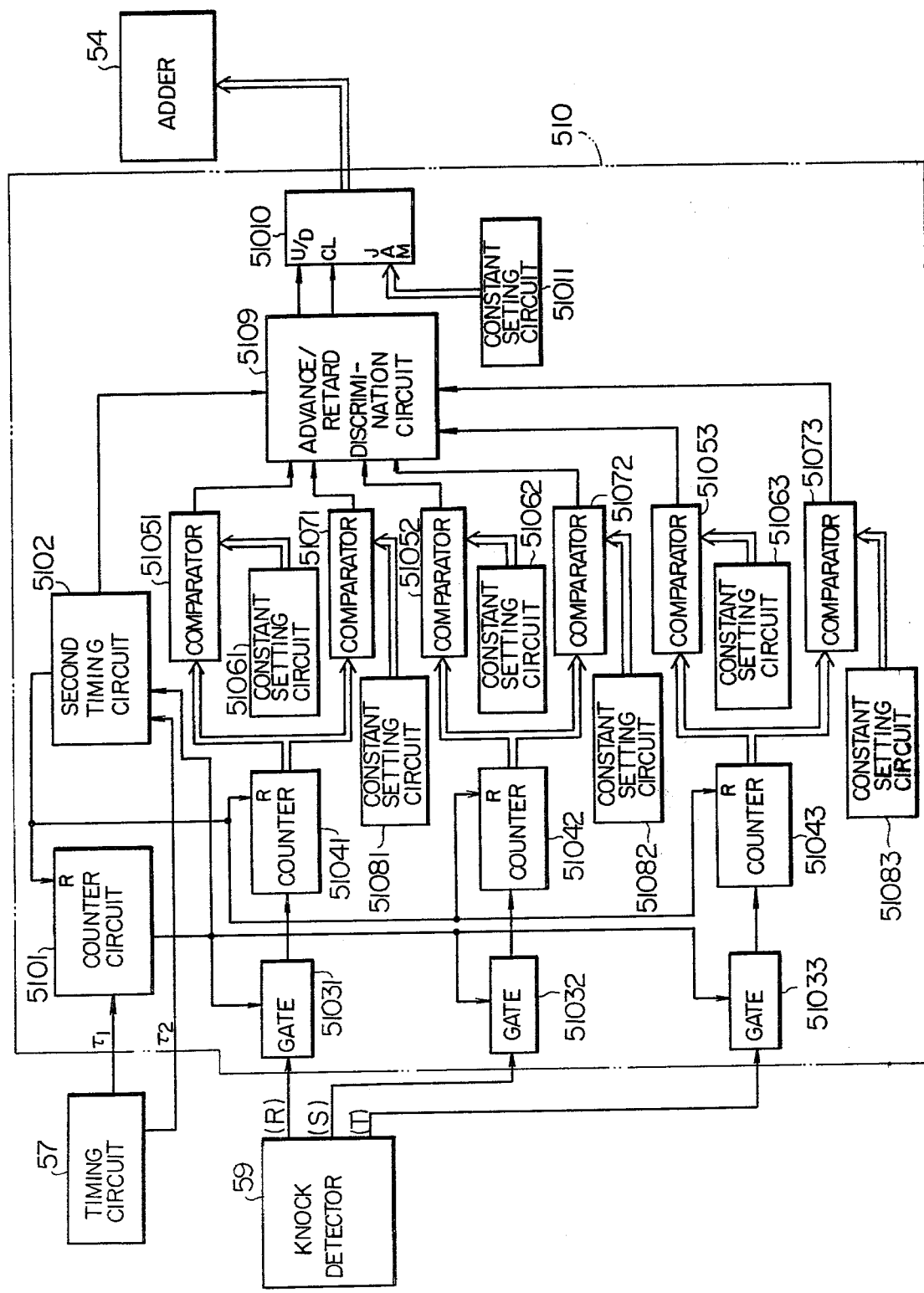
FIG. 7 is a block diagram showing an embodiment of the correction advance computing circuit in the embodiment of FIG. 1.

The operation of the correction advance computing circuit 510 will now be described with reference to FIG. 7. The correction advance computing circuit 510 comprises a scale of m+1 ring counter circuit 5101 whereby the pulses of $\tau_1$ from the timing circuit 57 are counted and its output goes to the "1" level when the count reaches a preset number m+1, a second timing circuit 5102 for receiving the output of the counter circuit 5101 and the pulses of $\tau_2$ from the timing circuit 57 to apply a timing signal to an advance/retard discrimination circuit 5109 and a reset signal to the counter circuit 5101 and counters 51041, 51042 and 51043, three gates 51031, 51032 and 51033 for passing the outputs (R), (S) and (T) of the knock detecting circuit 59 only when the output of the counter circuit 5101 is "0", the counters 51041, 51042 and 51043 for respectively counting the knock signals (R), (S) and (T) passed through the gates 51031, 51032 and 51033 to generate the resulting count numbers $n_1$, $n_2$ and $n_3$, comparators 51051, 51052 and 51053 for respectively comparing the outputs $n_1$, $n_2$ and $n_3$ of the counters 51041, 51042 and 51043 with the preset numbers $a_1$, $a_2$ and $a_3$ of constant setting circuits 51061, 51062 and 51063 so that the comparator 51051 generates a "1" level output when $n_1 \geq a_1$ and a "0" level output when $n_1 \leq a_1$, the comparator 51052 generates a "1" level output when $n_2 \geq a_2$ and a "0" level output when $n_2 \leq a_2$ and the comparator 51053 generates a "1" level output when $n_3 \geq a_3$ and a "0" level output when $n_3 \leq a_3$, comparators 51071, 51072, and 51073 for respectively comparing the outputs $n_1$, $n_2$ and $n_3$ of the counters 51041, 51042 and 51043 with the present numbers $b_1$, $b_2$ and $b_3$ of constant setting circuits 51081, 51082 and 51083 so that the comparator 51071 generates a "1" level output when $n_1 \geq b_1$ and a "0" level output when $n_1 < b_1$, the comparator 51072 generates a "1" level output when $n_2 < b_2$ and a "0" level output when $n_2 < b_2$ and the comparator 51073 generates a "1" level output when $n_3 \geq b_3$ and a "0" level output when $n_3 < b_3$ (when $a_1 \geq b_1$, $a_2 \geq b_2$ and $a_3 \geq b_3$), the advance/retard discrimination circuit 5109 for receiving the timing signal from the timing circuit 5102, the output signals of the comparators 51051, 51052 and 51053 and the output signals of the comparators 51071, 51072 and 51073 to generate an up/down signal (U/D) and a clock signal (CL), and an up/down counter 51010 for receiving the up/down signal (U/D) and the clock signals (CL) from the advance/retard discrimination circuit 5109 and the preset number (c) of a constant setting circuit 51011, whereby the clock signals (CL) are sequentially counted up or counted down from the present number (c) and the current count number is generated.

The operation of the circuit will now be described with reference to the time chart of FIG. 8. The counter circuit 5101 determines a fixed number of times of sampling m. This number of times m may be in the range of several tens to several tens of hundreds of times or over, and assuming for purposes of description that the number of times m is 1000, the preset number of the counter circuit 5101 is selected "1001" so that the pulses of $\tau_1$ shown in (a) of FIG. 8 are counted and the output of the counter circuit 5101 goes to the "1" level as shown in (c) of FIG. 8 in response to the positivegoing transition of the 1001st pulse.

In this case, the gates 51031, 51032 and 51033 are closed and by this time as many knock signals (R), (S) and (T) as the number of occurrences of knock $n_1$, $n_2$ and $n_3$, respectively, have been counted by the counters 51041, 51042 and 51043, respectively.

Figure 8:
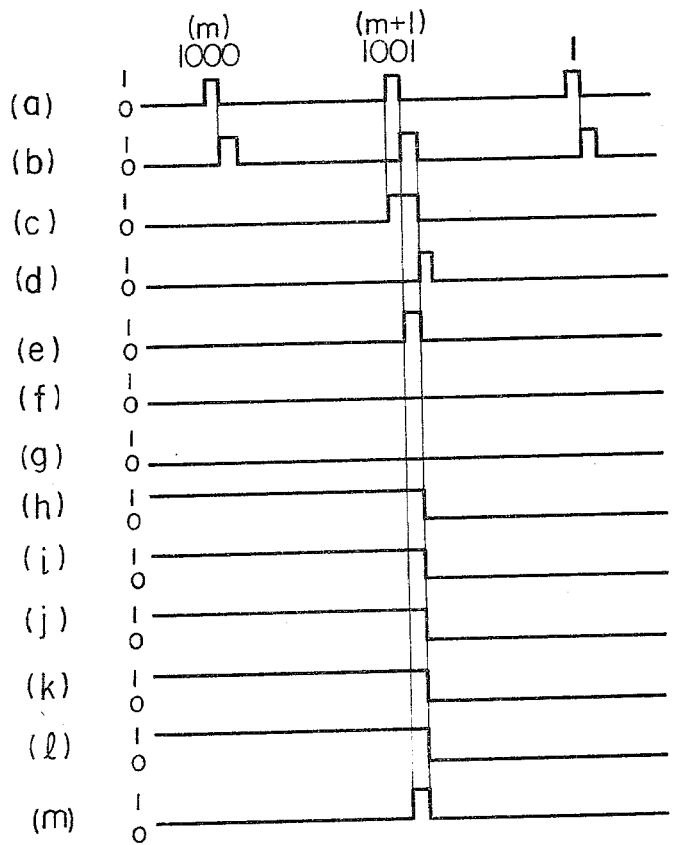
FIG. 8 is a time chart useful for explaining the operation of the circuit shown in FIG. 7.

When the number of occurrences $n_i$ ($i=1, 2, 3$) is $n_i \geq a_i \geq b_i$, the comparators 51051, 51052, 51053, 51071, 71072 and 51073 each generates a "1" level output, so that the advance/retard discrimination circuit 5109 generates the "1" level up signal shown in (l) of FIG. 8 and the clock signal shown in (m) of FIG. 8 or the timing signal from the second timing circuit 5102 shown in (e) of FIG. 8 and synchronized with the 1001st pulse of $\tau_2$ shown in (b) of FIG. 8. Here, shown in (f) to (k) of FIG. 8 are respectively the output signals of the comparators 51051 to 51053 and 51071 to 51073. The up/down counter 51010 receives the up signal and the clock signal so that the count is increased by 1 and the resulting count number is applied as a correction angle $\theta_k$ to the adder 54. Consequently, the data applied to the inputs JAM of the counter 55 is increased by 1 and the counter 55 counts out later than previously by 1, thus retarding the ignition timing by 1° crank angle. This operation of retarding the ignition timing by 1° crank angle takes place when the output of any one of the comparators 51051, 51052 and 51053 goes to the "1" level or when any one of the conditions $n_1 \geq a_1$, $n_2 \geq a_2$ and $n_3 \geq a_3$ is established.

When the number of occurrences of knock $n_i$ ($i=1, 2, 3$) is $n_i < b_i \leq a_i$, the comparators 51051, 51052, 51053, 51071, 51072 and 51073 each generates a "0" level output. When this occurs, the advance/retard discrimination circuit 5109 generates a "0" level down signal and the clock signal which is the same as shown in (m) of FIG. 8. Consequently, the U/D counter 51010 decreases the count by 1. As a result, the data applied to the inputs JAM of the counter 55 is decreased by 1 and the counter 55 counts out earlier than previously by 1, thus advancing the ignition timing by 1° crank angle. This operation of advancing the ignition timing by 1° crank angle takes place when the outputs of the comparators 51071, 51072 and 51073 all go to the "0" level or when the conditions $n_1 < b_1$, $n_2 < b_2$ and $n_3 < b_3$ are established simultaneously.

When the number of occurrences of knock $n_i$ ($i=1, 2, 3$) is such that the conditions $n_1 < a_1$, $n_2 < a_2$ and $n_3 < a_3$ are all established and at least one of the conditions $n_1 > b_1$, $n_2 > b_2$ and $n_3 > b_3$ is established, the outputs of the comparators 51051, 51052 and 51053 all go to the "0" level and the output of at least one of the comparators 51071, 51072 and 51073 goes to the "1" level, so that the advance/retard discrimination circuit 5109 generates a "0" level down signal and the clock signal remains at the "0" level producing no pulse. Consequently, the up/down counter 51010 does not change its count number and the previous count number is applied to the adder 54, thus maintaining the previous advance angle.

The reset signal from the second timing circuit 5102 is a short pulse which goes to the "1" level in response to the negative-going transition of the 1001st pulse of $\tau_2$ as shown in (d) of FIG. 8, so that the counter circuit 5101 and the counters 51041, 51042 and 51043 are reset, thus starting the next 1000 times of sampling.

When the first 1000 times of sampling resulted in $n_i > a_i > b_i$ thus retarding the ignition timing by 1° and the next 1000 times of sampling also results in the same $n_i > a_i > b_i$, the count number of the up/down counter 51010 is increased than previously by 2 and the ignition timing is retarded by 2° crank angle. In this way, the count number of the up/down counter 51010 is increased or decreased suitably and the advance angle is adjusted, thus bringing the number of occurrences of knock into the preset range of $a_i > n_i \geq b_i$.

Here, the preset numbers $a_1$ and $b_1$ should each preferably be on the order of several % of the number of times of sampling and it is also necessary to reduce the number of occurrences of light knock and heavy knock which are severer in intensity than the track knock of a lower knock intensity. Thus, it is desirable to select so that $a_3 \geq a_2 \geq a_1$ and $b_3 \geq b_2 \geq b_1$. Since the optimum ignition timing of an engine is one which will cause several % of trace knock, if it is assumed for example that $a_3 = 50$ and $b_3 = 20$ with the sampling rate of 1000, it is possible to always effect the feedback control to maintain the number of occurrences of knock in a range of 2 to 5% on an average. If it is selected so that $a_2 = 10$, $b_2 = 3$, $a_1 = 5$ and $b_1 = 1$, for example, the number of occurrences of light knock and heavy knock which are detrimental to the engine operation can be respectively controlled to fall in a range of 0.3 to 1% and 0.1 to 0.5%.

While, in the embodiment described above, the knock detector 4 is of the type which detects knock from the engine vibration, the same effect may be obtained by detecting knocking sound with a microphone. Also the vibration sensor may be any one of various types, such as acceleration type, speed type and position displacement type.

Further, while, in the above embodiment, knock is detected and counted according to the three degrees of knock (trace, light and heavy knock), knock may be detected according to a greater number of degrees or alternatively knock may be detected according to only two degrees of knock (trace knock and light and severer knock).

Further, as the simplest arrangement, by selecting the percentage of trace knock to fall in a range 2 to 5% ($a_3 = 50$, $b_3 = 20$, $m = 1000$) and also selecting the upper limit of light and severe knock 0.5% ($a_2 = 5$, $m = 1000$), it is only necessary to retard the ignition timing when the output of either one of the comparators 51052 and 51053 goes to the "1" level and to advance the ignition timing when the outputs of the comparators 51073 and 51052 both go to the "0" level. In this way, the desired objective can be achieved with a simpler arrangement.

A second embodiment of the system of the invention will now be described. The overall circuit construction of the second embodiment is identical with the first embodiment of FIG. 1 except a part of the knock detecting circuit 59 and a part of the correction advance computing circuit 510. Thus, only the construction and operation of these different portions will be described mainly.

Figure 9:
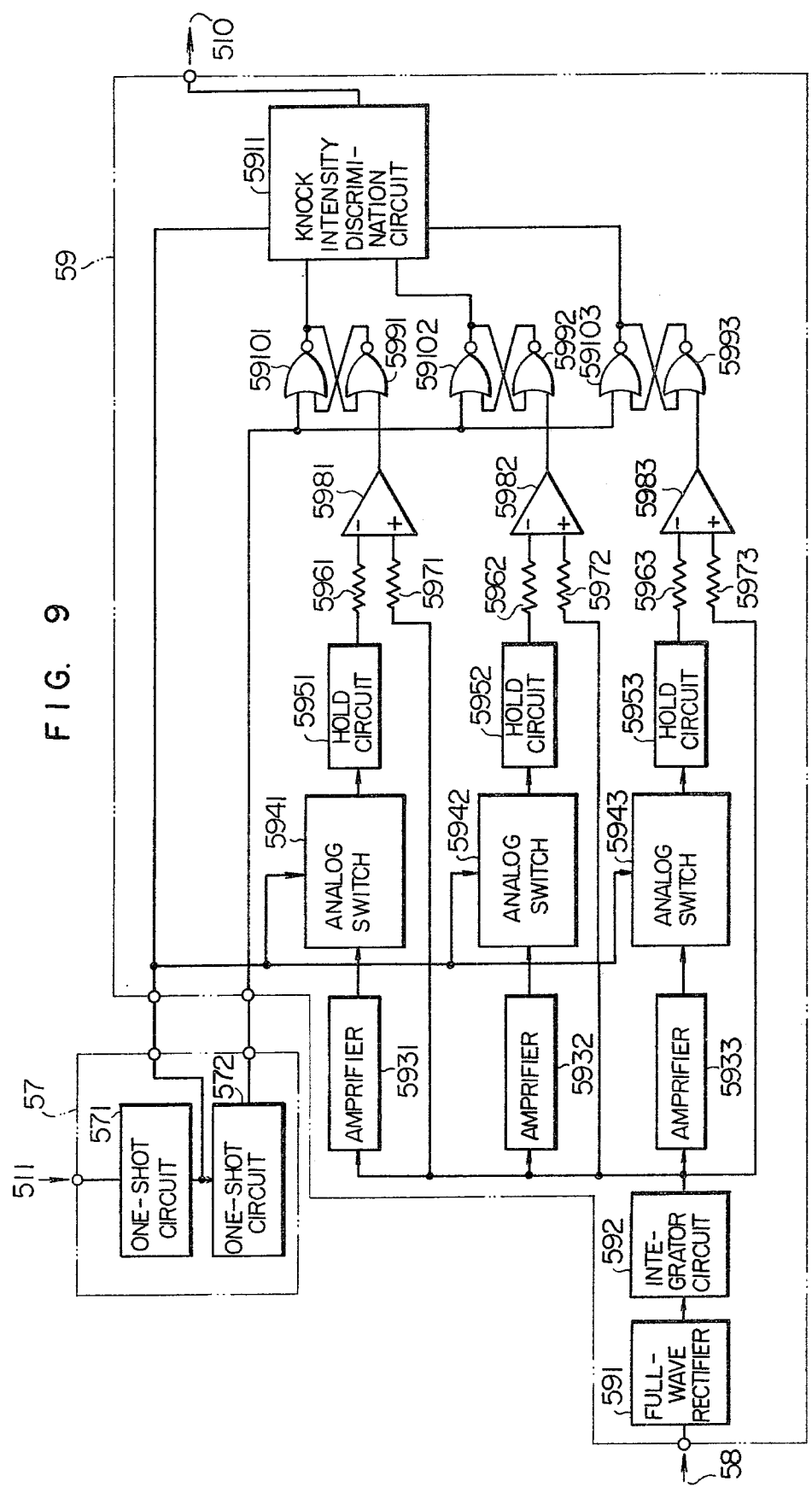
FIG. 9 is a detailed block diagram showing another embodiment of the timing circuit and the knock detecting circuit in the embodiment of FIG. 1.

Similarly as the knock detecting circuit of the first embodiment shown in FIG. 5, a knock detecting circuit 59 shown in FIG. 9 comprises a full-wave rectifier circuit 591, an integrator circuit 592, three amplifiers 5931, 5932 and 5933, three analog switches 5941, 5942 and 5943, three hold circuits 5951, 5952 and 5953 each comprising a resistor and a capacitor, input resistors 5961, 5971, 5962, 5972, 5963 and 5973, three comparator circuits 5981, 5982 and 5983 and NOR circuits 5991, 59101, 5992, 59102, 5993 and 59103. However, the outputs of these NOR circuits are applied to a single knock intensity discrimination circuit 5911 in place of the three AND circuits.

In the same manner as the knock detecting circuit of FIG. 5, a vibration input is full-wave rectified by the full-wave rectifier circuit 591, smoothed by the integrator circuit 592 comprising a parallel combination of a resistor and a capacitor and the resulting average value of the vibration input is coupled to the amplifiers 5931, 5932 and 5933 and the resistors 5971, 5972 and 5973. The applied value is amplified $K_1$, $K_2$ and $K_3$ times by the amplifiers 5931, 5932 and 5933, respectively, and the amplified values are respectively applied to the hold circuits 5951, 5952 and 5953 through the analog switches 5941, 5952 and 5953 which are each turned on for the duration of the time width $\tau_1$. The average vibration input during the time $\tau_1$ immediately following each ignition is generated from each of the hold circuits 5951, 5952 and 5953. The outputs are respectively applied through the resistors 5961, 5962 and 5963 to one inputs of the comparator circuits 5981, 5982 and 5983 whose other inputs directly receive the output of the integrator circuit 592 through the resistors 5971, 5972 and 5973, respectively. The vibration input memorized during the time $\tau_1$ represents the average value of the base vibration containing a noise signal and the values which are respectively $K_1$, $K_2$ and $K_3$ times the average value are compared in magnitude with the signal directly applied from the integrator circuit.

In this case, by selecting the amplification factors $K_1$, $K_2$ and $K_3$ of the amplifiers 5931, 5932 and 5933 $K_1 = 2.5$, $K_2 = 1.8$ and $K_3 = 1.3$, for example, the integrator output signal will be compared in magnitude with the values which are respectively 2.5, 1.8 and 1.3 times the average value of the base vibration. When knock occurs, if this is a heavy knock condition where the magnitude of the knocking vibration is greater than 2.5 times the base vibration, the outputs of the comparator circuits 5981, 5982 and 5983 all go to the "1" level, so that the "1" level outputs are respectively applied to one inputs of the flip-flops formed by the NOR circuits 5991 and 59101, 5992 and 59102, and 5993 and 59103, and consequently the outputs of the NOR circuits 59101, 59102 and 59103 are all changed to the "1" level. In the case of a light knock condition where the magnitude of the knocking vibration is 1.8 to 2.5 times the base vibration, the output of the comparator circuit 5981 goes to the "0" level and the outputs of the comparator circuits 5982 and 5983 go to the "1" level, so that the output of the NOR circuit 59101 remains at the "0" level and the outputs of the NOR circuits 59102 and 59103 go to the "1" level. Similarly, in the case of a trace knock condition where the magnitude of the knocking vibration is 1.3 to 1.8 times the base vibration, the outputs of the comparator circuits 5981 and 5982 go to the "0" level and the output of the comparator circuit 5983 goes to the "1" level, so that the outputs of the NOR circuits 59101 and 59102 remain at the "0" level and the output of the NOR circuit 59103 goes to the "1" level. In the case of a non-knocking condition where the magnitude of the knocking vibration is less than 1.3 times the base vibration, the outputs of the comparator circuits 5981, 5982 and 5983 all go to the "0" level and consequently the outputs of the NOR circuits 59101, 59102 and 59103 all remain at the "0" level.

The knock intensity discrimination circuit 5911 receives the outputs of the NOR circuits 59101, 59102 and 59103 and the pulses of the time width $\tau_1$ from the timing circuit 57 to generate as knock signals pulses corresponding to the respective degrees of knock intensity as shown in the following table in accordance with the time chart of FIG. 10.

|  | NOR circuit output level | | | No. of output pulses of knock intensity discrimination circuit |
|---|---|---|---|---|
|  | 59101 | 59102 | 59103 |  |
| Heavy knock | 1 | 1 | 1 | 3 |
| Light knock | 0 | 1 | 1 | 2 |
| Trace knock | 0 | 0 | 1 | 1 |
| Non-knocking | 0 | 0 | 0 | 0 |

Figure 10:
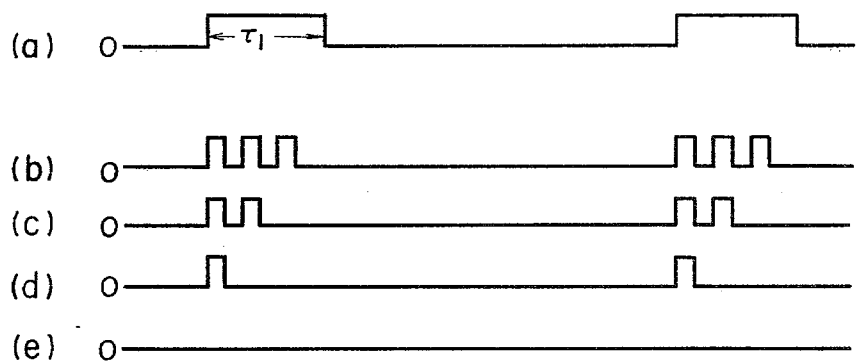
FIG. 10 is a time chart useful for explaining the operation of the knock intensity discrimination circuit in the circuitry shown in FIG. 9.

In other words, when the pulse of $\tau_1$ in (a) of FIG. 10 is at "1", in accordance with the knock intensity the corresponding pulse or pulses are generated, that is, the three pulses shown in (b) of FIG. 10 for the heavy knock, the two pulses in (c) of FIG. 10 for the light knock, the one pulse in (d) of FIG. 10 for the trace knock and the non-pulse signal in (e) of FIG. 10 for the non-knocking condition.

Figure 11:
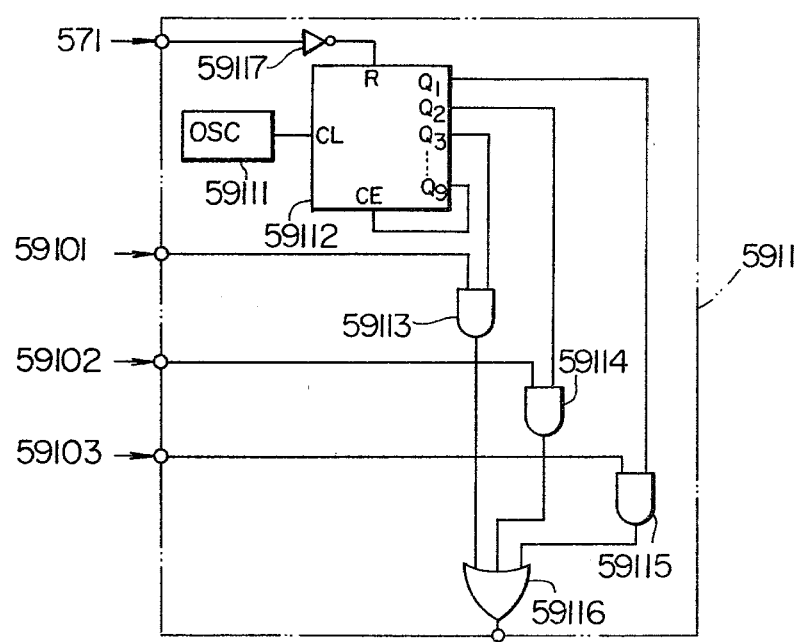
FIG. 11 is a detailed circuit diagram showing an embodiment of the knock intensity discrimination circuit.

Referring now to FIG. 11 showing a detailed circuit construction of the knock intensity discrimination circuit 5911, the circuit comprises an oscillator 59111 having a period which is sufficiently short as compared with the pulse of $\tau_1$, a decade counter 59112 having its $Q_4$ output and clock enable terminal connected to each other, AND circuits 59113 to 59115, an OR circuit 59116 and an inverter 59117. The $\tau_1$ pulse is applied to the reset terminal of the decade counter 59112 through the inverter 59117, so that in response to the occurrence of the $\tau_1$ pulse the decade counter 59112 counts the clock signals applied from the oscillator 59111 and a "1" level output is generated sequentially at its $Q_1$ to $Q_9$ outputs. The count operation is stopped in response to the generation of a "1" level output at the $Q_9$ output. The $Q_1$ to $Q_3$ outputs of the decade counter 59116 are respectively applied to the OR circuit 59116 through the AND circuit 59113 when the output of the comparator 59101 is at the "1" level, through the AND circuit 59114 when the output of the comparator 59102 is at the "1" level and through the AND circuit 59115 when the output of the comparator 59103 is at the "1" level. In this way, the outputs shown in the previously mentioned FIG. 10 can be generated from the OR circuit 59116.

Figure 12:
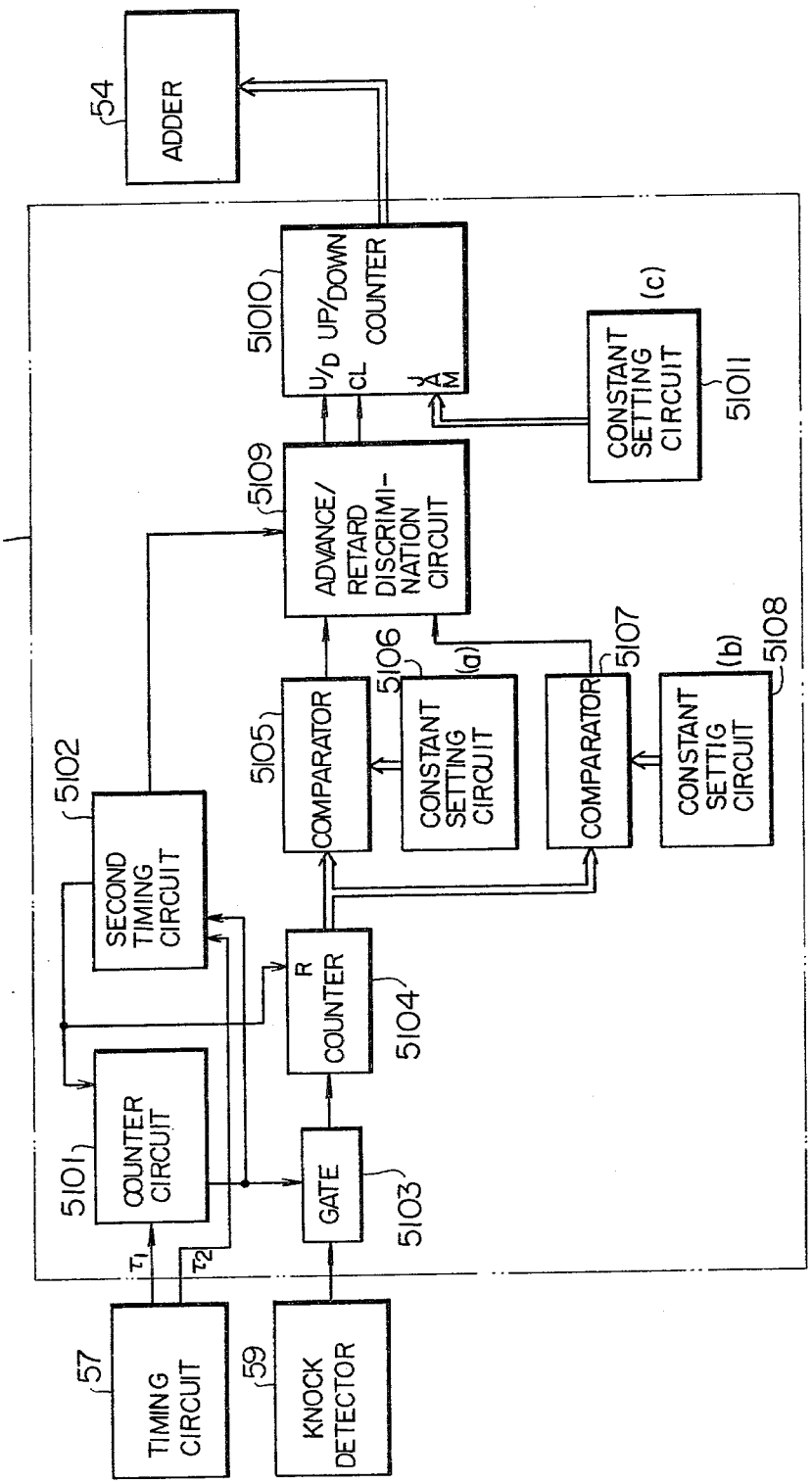
FIG. 12 is a detailed block diagram showing another embodiment of the correction advance computing circuit used in the embodiment of FIG. 1.

Referring now to FIG. 12, the operation of a correction advance computing circuit 510 will be described. The correction advance computing circuit 510 comprises a scale of m+1 ring counter circuit 5101 for counting the $\tau_1$ pulses from the timing circuit 57 and changing its output to the "1" level when the count attains a preset number m+1, a second timing circuit 5102 for receiving the output of the counter circuit 5101 and the $\tau_2$ pulses from the timing circuit 57 to apply a timing signal to an advance/retard discrimination circuit 5109 and a reset signal to the counter circuit 5101 and a counter 5104, a gate 5103 for passing the output of the knock detecting circuit 59 only when the output of the counter circuit 5101 goes to "0", the counter 5104 for counting the knock signals passed through the gate 5103 to generate the resulting count number n, a comparator 5105 for comparing the output n of the counter 5104 with the preset number a of a constant setting circuit 5106 to generate a "1" level output when n≧a and generate a "0" level output when n<a, a comparator 5107 for comparing the output n of the counter 5104 with the preset number b of a constant setting circuit 5108 to generate a "1" level output when n≧b and generate a "0" level output when n<b (where a≧b), the advance/retard discrimination circuit 5109 for receiving the timing signal from the second timing circuit 5102, the output signal of the comparator 5105 and the output signal of the comparator 5107 to generate an up/down signal (U/D) and a clock signal (CL), and an up/down counter 51010 for receiving the up/down signal (U/D) and the clock signal (CL) from the advance/retard discrimination circuit 5109 and the preset number (c) of a constant setting circuit 51011 to sequentially count up or count down the clock signals (CL) from the preset number (c) and generate the current count number.

Figure 13:
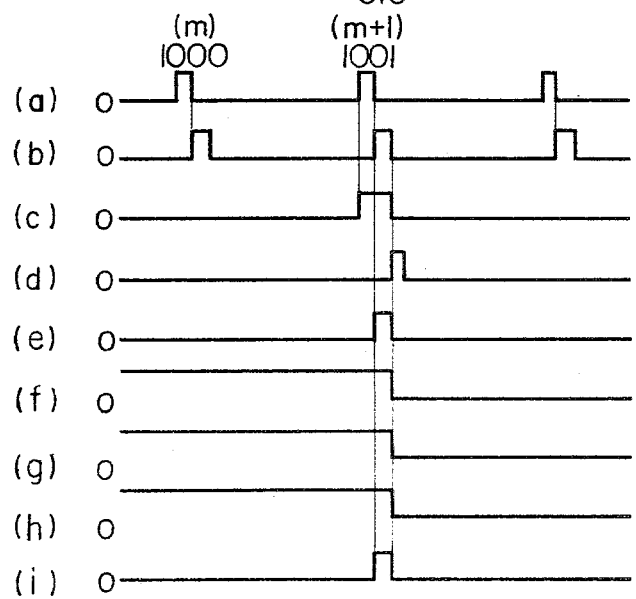
FIG. 13 is a time chart useful for explaining the operation of the circuit shown in FIG. 12.

Next, the operation of the correction advance computing circuit 510 will be described with reference to FIG. 13. The counter circuit 5101 determines a predetermined number of times of sampling m. The number of times m may be in the range of several tens to several hundreds times or over, and if the number of times m is assumed 1000 for purposes of description, the preset number of the counter circuit 5101 is "1001". Thus, the pulses of $\tau_1$ shown in (a) of FIG. 13 are counted and the output of the counter circuit 5101 goes to the "1" level as shown in (c) of FIG. 13 in response to the positive-going transition of the 1001st pulse. When this occurs, the gate 5103 is closed and by this time as many knock signals as the number of knock signal pulses n generated during the 1000 times of sampling have been counted by the counter 5104.

When the number of pulses n is n≧a≧b, the comparators 5105 and 5107 each generates a "1" level output as shown in (f) and (g) of FIG. 13, so that the advance/retard discrimination circuit 5109 generates the "1" level up signal shown in (h) of FIG. 13 and the clock signal shown in (i) of FIG. 13 or the timing signal shown in (e) of FIG. 13 and synchronized with the 1001st pulse of $\tau_2$ shown in (b) of FIG. 13. The up/down counter 51010 receives the up signal and the clock signal so that the count is increased by 1 and the resulting count number is applied as a correction angle $\theta_k$ to the adder 54. As a result, the data applied to the inputs JAM of the counter 55 is increased by 1 and the counter 55 counts out later than previously by 1, thus retarding the ignition timing by 1° crank angle. When the number of knock signal pulses n is a>n≧b, the comparator 5105 generates a "0" level output and the comparator 5107 generates a "1" level output. When this occurs, the advance/retard discrimination circuit 5109 generates a "0" level down signal and the clock signal remains at the "0" level producing no pulse. As a result, the up/down counter 51010 does not change the count so that the previous count number is applied to the adder 54 and the advance angle remains the same as previously. When the number of knock pulses n is a≧b>n, the comparators 5105 and 5107 each generates a "0" level output. In this case, the advance/retard discrimination circuit 5109 generates a "0" level down signal and the same clock signal as in (i) of FIG. 13. Consequently, the up/down counter 51010 decreases the count by 1. As a result, the data applied to the inputs JAM of the counter 55 is decreased by 1 and it counts out earlier than previously by 1, thus advancing the ignition timing by 1° crank angle. The reset signal from the second timing circuit 5102 is a short pulse which goes to the "1" level in response to the negative-going transition of the 1001st pulse of $\tau_2$ as shown in (d) of FIG. 13, and the reset signal resets the counter circuit 5101 and the counter 5104, thus starting the next 1000 times of sampling.

On the other hand, when the first 1000 times of sampling resulted in $n \geq a \geq b$ thus retarding the ignition timing by 1° crank angle and the next 1000 times of sampling also results in the same $n \geq a \geq b$, the count number is increased than previously by 2, thus retarding the ignition timing by a total of 2° crank angle. In this way, the count number of the up/down counter 51010 is suitably increased or decreased and the advance angle is adjusted to bring the number of knock signal pulses into the preset range of $a \geq n \geq b$.

The preset numbers a and b should each preferably be on the order of several % of the number of times of sampling, and if it is selected so that $a=50$ and $b=20$ for 1000 times of sampling, it is possible to effect the feedback to always ensure a trace knock condition where the occurrence of trace knock is in the range of 2 to 5% on an average.

Particularly, the occurrence of severe knock (heavy knock, light knock) is not desirable and thus the feedback is applied in such a manner that the occurrence of such severe knock results in the generation of a greater number of knock signals and the ignition timing is retarded, thus controlling the knock condition to the predetermined trace knock condition (where the occurrence of trace knock is on the order of several %).

While, in the above description, the number of knock signal pulses are 3 for the heavy knock, 2 for the light knock and 1 for the trace knock, it is evident that greater effect can be obtained by increasing the weights, as for example, 10 pulses for the heavy knock, 3 pulses for the light knock and 1 pulse for the trace knock particularly for the purpose of preventing the occurrence of heavy knock.

Further, while the discrimination of knock intensities is effected according to the amplification factors of the base vibration, that is, 2.5, 1.8 and 1.3 times of the base vibration average value for the heavy knock, light knock and trace knock, respectively, it is of course necessary to use different amplification factors for different types of engines. Still further, while the integrator output is compared with the average value of the base vibration, it is possible to compare the integrator output with the peak value of the base vibration, for example.

We claim:

1. A method for controlling the ignition timing of an internal combustion engine responsive to the knocking of the engine, comprising the steps of:

sensing the knocking of the engine;

detecting the magnitude of the knocking with respect to at least first, second and third predetermined magnitude levels during each combustion cycle of the engine and generating first, second and third knocking signals whenever the magnitude of the sensed knocking exceeds said first, second and third predetermined magnitude levels, respectively;

sampling said knocking signals for a sampling period of not less than several tens of times of combustion cycles of the engine and counting respective numbers of said first, second and third knocking signals produced during said sampling period;

comparing said numbers of said first, second and third knocking signals respectively with three different reference ranges and generating an ignition timing correction signal to effect either a retard or an advance of ignition timing depending on whether at least one of said numbers exceeds a corresponding one of said three different reference ranges or all of said numbers are below respective ones of said three different reference ranges.

2. A method for controlling the ignition timing of an internal combustion engine responsive to comprising the steps of:

sensing the knocking of the engine;

detecting the magnitude of the knocking with respect to at least first and second predetermined magnitude levels during each combustion cycle of the engine and generating first and second knocking signals whenever the magnitude of the sensed knocking exceeds said first and second predetermined magnitude levels respectively;

weighing said first and second knocking signals by generating different numbers of pulse signals for each of said first and second knocking signals;

sampling for a period corresponding to a predetermined number of combustion cycles of the engine said weighted knocking signals represented by said different numbers and counting the sum of said different numbers of pulse signals corresponding to said first and second knocking signals;

comparing said sum with a predetermined reference range and generating an ignition timing correction signal to effect either a retard or an advance of ignition timing depending on whether said sum is above or below said predetermined reference range.

3. A system for controlling the ignition timing of an internal combustion engine responsive to the knocking of the engine, comprising:

a knocking sensor for sensing the knocking of the engine;

means, responsive to a signal from said knocking sensor, for detecting the magnitude of the knocking, said detecting means including:

first, second and third comparison circuits for comparing said signal from said knocking sensor respectively with first, second and third predetermined magnitude levels, and a knocking signal generating circuit, responsive to output signals from said first, second and third comparison circuits, for providing for each combustion cycle of the engine first, second and third knocking signals respectively whenever said signal from said knocking sensor exceeds said first, second and third predetermined levels;

counter means connected to receive said first, second and third knocking signals from said detecting means, said counter means for separately counting the numbers of said first, second and third knocking signals during not less than several tens times of combustion cycles of the engine, comparison means connected to said counter means for separately comparing said respective counted numbers of knocking signals with first, second and third reference ranges, and ignition timing correction signal generating means connected to said comparison means for generating an ignition timing correction signal either to retard or to advance the ignition timing of the engine by a predetermined crank angle depending on whether at least one of said counted numbers exceeds a corresponding one of said first, second and third reference ranges or all of said counted numbers are below their respective corresponding first, second and third reference ranges.

4. A system for controlling the ignition timing of an internal combustion engine responsive to the knocking of the engine, comprising:

a knocking sensor for sensing the knocking of the engine;

means for detecting the magnitude of the knocking in response to a signal from said knocking sensor, said detecting means including:

first and second comparison circuits for comparing said signal from said knocking sensor respectively with first and second predetermined magnitude levels, a knocking signal generating circuit responsive to output signals from said first and second comparison circuits, for producing for combustion cycle of the engine first and second knocking signals respectively whenever said signal from said knocking sensor exceeds said first and second predetermined levels, and a knock intensity discriminating circuit for weighting said first and second knocking signals by generating different numbers of pulse signals for each of said first and second knocking signals, counting means, connected to receive said different numbers of pulse signals from said detecting means, for counting the sum of said pulse signals during a sampling period corresponding to a predetermined number of combustion cycles of the engine, comparison means connected to said counter means for comparing said sum with a predetermined reference range, and ignition timing correction signal generating means connected to said comparison means for generating an ignition timing correction signal either to retard or to advance ignition timing by a predetermined crank angle depending on whether said sum of pulse signals is above or below said predetermined reference range.

* * * * *